(12) United States Patent
Bandera et al.

(10) Patent No.: US 7,106,374 B1
(45) Date of Patent: Sep. 12, 2006

(54) DYNAMICALLY RECONFIGURABLE VISION SYSTEM

(75) Inventors: Cesar Bandera, Buffalo, NY (US); David J. Stack, Silver Creek, NY (US); Christopher Kramer, Williamsville, NY (US); Terence H. McLoughlin, Buffalo, NY (US)

(73) Assignee: Amherst Systems, Inc., Buffalo, NY (US)

( * ) Notice: Subject to any disclaimer, the term of this patent is extended or adjusted under 35 U.S.C. 154(b) by 0 days.

(21) Appl. No.: 09/542,562

(22) Filed: Apr. 4, 2000

Related U.S. Application Data (60) Provisional application No. 60/127,698, filed on Apr. 5, 1999.

(51) Int. Cl.
*H04N 5/335* (2006.01)
(52) U.S. Cl. .................. 348/308; 348/170
(58) Field of Classification Search .......... 348/207.1, 348/207.11, 211.9, 211.99, 169–172, 208.1, 348/208.14, 308; 382/103
See application file for complete search history.

(56) References Cited

U.S. PATENT DOCUMENTS

| | | |
|---|---|---|
| 3,715,485 A | 2/1973 | Weimer |
| 3,935,381 A | 1/1976 | Petrocelli et al. |
| 3,988,619 A | 10/1976 | Malaviya et al. |
| 4,011,441 A | 3/1977 | Michon et al. |
| 4,011,442 A | 3/1977 | Engeler |
| 4,067,046 A | 1/1978 | Nakatani et al. |
| 4,189,749 A | 2/1980 | Hiroshima et al. |
| 4,426,664 A | 1/1984 | Nagumo et al. |
| 4,603,354 A | 7/1986 | Hashimoto et al. |
| 4,712,135 A | 12/1987 | Hashimoto et al. |
| 4,734,772 A | 3/1988 | Akiyama |
| 4,819,059 A | 4/1989 | Pape |

(Continued)

FOREIGN PATENT DOCUMENTS

EP 0324 107 A2 7/1989

OTHER PUBLICATIONS

NASA Technology Brief from JPL New Technology Report NPO-20866, Real-Time Reconfigurable CMOS Imager with Variable High-Fidelity Spatial Sampling with Multiple Windows, Apr. 1999.*

(Continued)

*Primary Examiner*—Tuan Ho
*Assistant Examiner*—Timothy J. Henn
(74) *Attorney, Agent, or Firm*—Kenneth J. Lukacher (57) ABSTRACT

A closed-loop vision system is disclosed that utilizes a concept known as Dynamically Reconfigurable Vision (DRV), which is adaptive image sensing driven by a computer or human operator's response to changing scenery. The system reduces the amount of irrelevant video information sensed and thus achieves more effective bandwidth and computational resource utilization, as compared to traditional vision systems. One or more reconfigurable photodetector arrays sensitive to either visible, infrared or ultraviolet radiation are present in the DRV system. These photodetector arrays feature on-chip means for spatial and temporal data reduction implemented through multiple independently controllable, time-correlated, frequently overlapping windows on the photodetector array that may be programmed according to their size, location, resolution, integration time, and frame rate. All photodetector array windows are dynamically reconfigurable in real time on a frame-by-frame basis. Furthermore, a DRV system is constructed in a client-server architecture in which a vision processor client passes window request command messages to the reconfigurable photodetector array server, which in turn delivers the requested video back to the client processor. The ability to simultaneously reconfigure, integrate, process, and readout multiple photodetector array video windows is an important characteristic of the DRV system.

33 Claims, 6 Drawing Sheets

U.S. PATENT DOCUMENTS

| | | | |
|---|---|---|---|
| 4,942,473 | A | 7/1990 | Zeevi et al. |
| 4,996,413 | A * | 2/1991 | McDaniel et al. ......... 250/208.1 |
| 4,996,600 | A | 2/1991 | Nishida et al. |
| 5,019,911 | A | 5/1991 | Okino et al. |
| 5,095,211 | A * | 3/1992 | Kimata ................ 250/370.08 |
| 5,196,939 | A * | 3/1993 | Elabd et al. ................ 348/314 |
| 5,216,484 | A * | 6/1993 | Chao et al. ................ 356/326 |
| 5,236,871 | A * | 8/1993 | Fossum et al. ............... 438/59 |
| 5,262,871 | A * | 11/1993 | Wilder et al. ............... 348/307 |
| 5,452,004 | A | 9/1995 | Roberts |
| 5,471,515 | A | 11/1995 | Fossum et al. |
| 5,493,335 | A | 2/1996 | Parulski et al. |
| 5,541,654 | A | 7/1996 | Roberts |
| 5,841,126 | A | 11/1998 | Fossum et al. |
| 5,909,026 | A | 6/1999 | Zhou et al. |
| 5,926,208 | A | 7/1999 | Noonen et al. |
| 5,949,483 | A * | 9/1999 | Fossum et al. ............. 348/303 |
| 5,959,574 | A | 9/1999 | Poore, Jr. |
| 5,973,311 | A | 10/1999 | Sauer et al. |
| 5,990,469 | A | 11/1999 | Bechtel et al. |
| 6,080,104 | A * | 6/2000 | Ozawa et al. ............... 600/180 |
| 6,556,241 | B1 * | 4/2003 | Yoshimura et al. .... 348/211.99 |
| 6,839,452 | B1 * | 1/2005 | Yang et al. ................ 382/103 |

OTHER PUBLICATIONS

Xia, S. et al., An All CMOS Foveal Image Sensor Chip, 11th International ASIC Conference, Rochester, NY, Sep. 1998.

Panicacci, R., et al., Programmable multiresolution CMOS active pixel sensor, Proc. SPIE vol. 2654 Solid State Sensor Arrays and CCD Cameras pp. 72-81 (1996).

Pain, B. et al., Active -Pixel Sensor ICs With Photosites in Substrates, NASA Tech Brief, vol. 23, No. 10, Oct. 1999 (from JPL New Technology Report NPO-20534).

General Electric Company, OSO, Optoelectronic Systems Operation—Notes, Solid State Imaging Module, pp. 1-3.

Burt, P., The Laplacian Pyramid as a Compact Image Code, IEEE Transactions on Communications, vol. COM-31, No. 4, pp. 532-540, Apr. 1983.

Nishizawa, S. et al., A New, Transversal Signal Line (TSL) Type Solid State Imager, Hitachi Ltd., Mobara Works, Mobara, Chiba, Japan 297, pp. 42-47.

Brown, D. et al., Session II: Advances in CCD and Imaging, IEEE International Solid-State Circuits Conference, pp. 28-29, ISSCC 80, Wednesday, Feb. 13, 1980, Continental Ballroom 6, 10:00 A.M.

Aoki, M. et al., 2 / 3-Inch Format MOS Single-Chip Color Imager, IEEE Transactions on Electron Devices, vol. ED-29, No. 4, pp. 745-750, Apr. 1982.

Burke, H. et al., Charge-Injection Imaging: Operating Techniques and Performances Characteristics: IEEE, Trans. Electron Devices, vol. ED-23, pp. 189-195, Feb. 1976.

Haig, N. et al., A Model of Human Vision for Machines, SPIE vol. 728 Optics, Illumination and Image Sensing for Machine Vision, pp. 19-27, (1986).

NASA Technology Brief from JPL New Technology Report NPO-20555, A High Speed CMOS Imager with Motion Artifact Suppression and Anti-Blooming.

NASA Technology Brief from JPL New Technology Report NPO-20866, Real-time Reconfigurable CMOS Imager with Variable High-Fidelity Spatial Sampling with Multiple Windows, Apr. 1999.

Bandera, C. et al., Foveal Machine Vision Systems, Proceedings of the IEEE International Conference on Systems, Man, and Cybernetics, Cambridge, MA, pp. 596-599, Nov. 1989.

Xia, S. et al., An All CMOS Foveal Image Sensor Chip, Proceedings of the 11th Annual IEEE International ASIC Conference, Sep. 13-16, 1998.

Rosenfeld, A. (ed), Multiresolution Image Processing and Analysis, Springer-Verlag, Ch. 1, 2, 3, 5 and 21, 1984.

Scott, P et al., Hierarchical Multiresolution Data Structures and Algorithms for Foveal Vision Systems, Proceedings of the IEEE International Conference on Systems, Man, and Cybernetics, Los Angeles, CA, Nov. 1990.

Bandera, C. et al., Retinotopic Processing for Active Foveal Vision, Proceedings of ACCV '95: Second Asian Conference on Computer Vision, vol. 2, Singapore, Dec. 5-8, 1995.

Bandera, C. et al., Multiacuity Target Recognition and Tracking, Proceedings of the Second Automatic Target Recognizer Systems and Technology Conference, Fort Belvoir Center for Night Vision and Electro-Optics, pp. 1-10, Mar. 17, 1992.

Mendis, S. et al., Progress in CMOS Active Pixel Image Sensors, SPIE vol. 2172, pp. 19-29, Apr. 4, 1994.

Mendis, S. et al., CMOS Active Pixel Image Sensors for Highly Integrated Imaging Systems, IEEE Journal of Solid-Statee Circuits, vol. 32, No. 2, pp. 187-197, Feb. 1997.

NASA Tech Briefs, pp. 26-32, May 1996.

Fossum, E., CMOS Digital Cameras Need New Figures of Merit, Laser Focus World, pp. 101-106, Apr. 1999.

Shandle, J., Technology Advances, Retina-Like Image Sensor Promises Real-Time Systems, Electronic Design, May 3, 1993.

Groves, G. et al., Reconfigurable Video Tracker, SPIE vol. 3692, pp. 216-225, Apr. 1999.

Nixon, R. et al., 128×128 CMOS Photodiode-Type Active Pixel Sensor With On-Chip Timing, Control and Signal Chain Electronics, SPIE, vol. 2415, pp. 117-123, (1995).

Bandera, C. et al., Machine Vision for Active Pursuit, The Foveal Alternative, Journal of Electronic Defense, Oct. 1991.

Mansoorian, B. et al., Megapixel CMOS APS with Analog and Digital Readout, IEEE CCD and Advanced Imager Conference, Bruges, Belgium, Jun. 5-7, 1997.

Nixon, R. et al., 256-256 CMOS Active Pixel Sensor Camera-On-A-Chip, IEEE International Solid State Circuits Conference, San Francisco, CA, Feb. 1996.

Photobit Corporation, Article entitled "Photobit Unveils Progressive-Scan Megapixel Image Sensor at International Solid-State Circuits Conference", Feb. 17, 1999.

Photobit: The Products—CMOS Image Sensors, printout from http://www.photobit.com/produx.htm, Sep. 24, 1999.

* cited by examiner

DYNAMICALLY RECONFIGURABLE VISION SYSTEM

This Application claims the benefit of priority to U.S. Provisional Application No. 60/127,698, filed Apr. 5, 1999, which in herein incorporated by reference.

FIELD OF INVENTION

The present invention is related to a vision system (and method), and related particularly to a vision system having reconfigurable CMOS video photodetector arrays providing multiple, time-correlated, overlapping, programmable photodetector array windows. The invention is suitable for single or multiple target viewing, detection, tracking, and identification, especially where such applications are constrained by requirements of limited bandwidth, processing capability, space, weight, or power.

BACKGROUND OF INVENTION

Vision systems for detecting, identifying, and tracking targets must acquire and process large volumes of video data in real time. Most applications requiring these tasks, however, are characterized by imagery where targets and other objects of interest occupy only a small fraction of the total scene. Hence, traditional imaging systems that employ uniform and constant spatial resolution throughout the entire field of view acquire much irrelevant information and thus burden valuable data processing and communication resources in the system. As a result, such systems are slow and do not operate at their full potential due to a flood of unimportant video information. Building vision systems with multiple cameras, several processors, high-bandwidth communication links, and specialized hardware will increase performance, but results in equipment that is complex, expensive, large, heavy, high power consuming, and prone to failures. These constraints make constant resolution vision systems difficult or impossible to use where space, speed of response, and reliability are critical considerations, for instance, in defense applications.

Humans and other vertebrates have foveal vision that allows them to concurrently perform several tasks: survey a wide field of view at a low resolution for situational awareness and detection of features or targets of interest; track moving targets with great accuracy; scan at high resolution these multiple targets of interest; and communicate over channels with limited bandwidth (neurons) the information of interest to the computer (brain). Because high-resolution imaging is limited to the fovea, which is fixed in the center of the retina, the tracking of targets involves movement of the eyes and the head.

The vision system of the present invention operates according to a concept termed Dynamically Reconfigurable Vision, or DRV, which is inspired by the biologically proven concept of foveal vision, but is further extended for practicality in a machine vision implementation. DRV is adaptive image sensing driven by a computer or human operator's response to changing scenery. One goal of this system is to reduce the amount of irrelevant video information sensed and thus achieve more effective bandwidth and computational resource utilization than traditional vision systems. This is achieved by a system controlled by a computer or microprocessor and a photodetector array for imaging a frame of a scene through multiple independently controllable, time-correlated, overlapping photodetector array windows, which are dynamically reconfigurable in real time, and where such windows in a frame are capable of having varying resolution.

Several vision systems or imaging photodetector arrays have been developed which do not enable DRV. U.S. Pat. No. 5,541,654 describes a focal plane array imaging device having sensor windowing, variable integration time, and snapshot mode. U.S. Pat. No. 5,990,469 describes a control system for an image array sensors providing multiple windows. U.S. Pat. No. 5,973,311 provides a pixel array imager with a high and low resolution mode. U.S. Pat. No. 5,949,483 describes a multiresolution image sensor that contains an electronic shutter, can form multiple pixel windows, and possesses a multiresolution imaging circuit for averaging pixels into groups of superpixels. U.S. Pat. No. 5,493,335 provides a color CCD sensor video camera that is adapted for processing images of different resolution to provide a user selectable image size. U.S. Pat. No. 5,926,208 describes a reconfigurable camera with low-bandwidth transmission capability using a conventional image sensor, processor, and memory that can hold several image compression algorithms. These vision systems and sensors do not provide a reduction in the amount of irrelevant information sensed through the use of a computer-controlled system for imaging a scene through multiple independently controllable, time-correlated, overlapping sensor windows.

In a publication by NASA's Jet Propulsion Laboratory, a photodetector array circuitry is described that performs snapshot imaging and pixel averaging, see F B. Pain and X. Zheng, Active Pixel Sensor with Photosites in Substrates, NASA Tech Brief, vol. 23, no. 10, October 1999 (from JPL New Technology Report NPO-20534). This circuitry requires the host computer to send control signals to the sensor for the extraction of the signal from each superpixel, and like the other prior art system, do not provide imaging a scene through a multiple independently controllable, time-correlated, overlapping sensor windows.

In U.S. Pat. No. 5,262,871, a multiresolution image sensor is described that inputs data representing a superpixel to a computer that controls the size of that superpixel. The computer extracts video data from the photodetector array one superpixel at a time. This is time consuming and reduces bandwidth by increasing the amount of interaction between the computer and the camera. Furthermore, the values reporting the level of illumination of the superpixels generated by the system are a function of pixel size in which this value is equal to the sum of the comprising pixels. The superpixel values are normalized so that the image processing algorithms do not erroneously interpret the superpixel to represent a bright scene region. This operation requires extra time and system memory, thus slowing down the image processing. Larger pixel values also require a wider dynamic range in the video communication circuits. In addition, the photodetector array described in U.S. Pat. No. 5,262,871 does not operate in a snapshot mode, so that the exposure time can be different for different pixels after the system has been reconfigured, requiring the computer to carry out additional normalization of pixel values in order to avoid a mistake in interpreting the pixel values in the context of the image. Moreover, because the pixels in this patent are exposed at different times, any motion in the field of view (due to camera and/or target motion) will introduce artifacts, such as target warping, artifacts that reduce the accuracy of the target classification. Overexposed pixels in an image will appear brighter than the properly exposed or underexposed pixels in the same image.

Other developed vision systems that use fixed geometry multiresolution have a two-dimensional photodetector array that has small size pixels in the center and larger size pixels in the periphery, closely simulating the anatomical structure of the retina. Such arrays are not reconfigurable, do not operate in a closed loop fashion with the vision processor, and require a pointing mechanism for gazing. Mechanical pointing suffers from instabilities and is slow. Further, because the topology of the array in a fixed geometry system cannot be changed on demand, some relevant regions of the scene may not be resolved adequately, as a result sacrificing system reliability and usefulness, while the irrelevant regions may be resolved too finely, hence reducing the efficiency of system resource utilization.

In still other systems, referred to as pyramidal machine vision systems, targets are detected using low resolution; these targets are then scanned using localized high-resolution windows. However, the pixels that form the high resolution windows are not combined into superpixels directly in the pixel array, but the information from individual pixels is combined in the computer so as to mimic superpixels. These techniques require the processing of video from a uniform resolution camera to generate the pyramid data structure. As a result, the communications bandwidth and the video processing resources are not used any more efficiently than in a conventional uniform resolution camera.

SUMMARY OF THE INVENTION

It is the principal object of the present invention to provide an improved vision system having a dynamically reconfigurable photodetector array that efficiently uses bandwidth and data processing resources.

A further object of the present invention is to provide an improved vision system that includes a video camera and a vision processor, which is located in a host computer or in the video camera.

Another object of the present invention is to provide an improved vision system having a video camera and vision processor connected in a closed loop system and interacting in a client-server relationship.

Another object of the present invention is to provide an improved vision system having a video camera and vision processor in which the vision processor sends commands specifying the imaging characteristics, such as spatial and temporal parameters, to the reconfigurable photodetector array.

Still further object of the present invention is to provide an improved vision system capable of automatically changing the resolution at which images or parts, such as windows, of images are acquired.

Another object of the present invention is to provide an improved vision system with a reconfigurable photodetector array having multiple windows: a background surveillance window at a low resolution for detecting targets and multiple overlapping higher resolution windows generated any place targets of interest are located in the field of view, such as to resolve additional image details of the targets.

Still another object of the present invention is to provide an improved vision system having a reconfigurable photodetector array for imaging a field of view in windows which can be time-correlated and retrieved by a vision processor simultaneously through multiple output channels of the photodetector array.

A still further object of this invention is to provide a vision system in which the location, size, and shape of the windows is automatically controlled in response to the location and morphology of the target.

Yet another object of this invention is to provide an improved vision system in which the resolution of the windows can progress in multiple steps from the highest (that of a single pixel) to the lowest (that of a single superpixel encompassing the entire field of view).

Briefly described, the present invention embodies a vision system that uses closed-loop photodetector array reconfiguration for efficient utilization of bandwidth and processing resources. The system comprises a video camera and a vision processor arranged in a client-server relationship and is capable of automatically detecting, recognizing, and tracking targets of interest. To accomplish these tasks, the client vision processor determines the spatial and temporal parameters of the incoming video signal, and then passes this information to the video camera server via a window request command. On a reconfigurable photodetector array in the video camera, the system forms a low-resolution background surveillance window capable of detecting targets of interest. Superimposed on this background window in a time-correlated, non-destructive fashion are multiple higher-resolution windows corresponding to the location in the field of view of the targets. The smaller windows supporting target tracking can co-exist in a single video frame with the wide field-of-view window, permitting the detection of new targets. The system can simultaneously retrieve and process the background surveillance window as well as the foreground superimposed target windows.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 1:
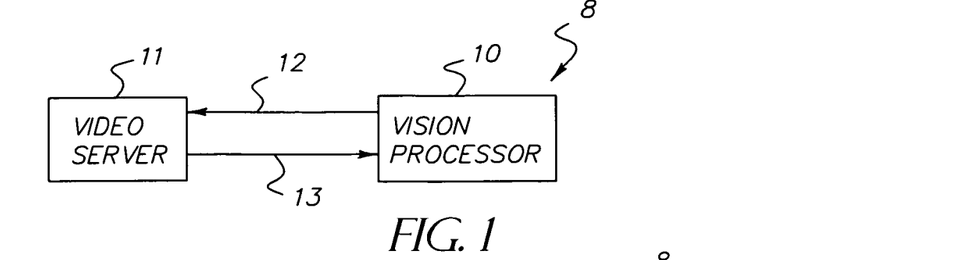
FIG. 1 is a block diagram depicting the major components in accordance with the present invention.

Referring to FIG. 1, a block diagram of the essential components of the DRV system 8 of the present invention is shown having two major modules: a reconfigurable video server 11 (typically embodied as a reconfigurable photodetector array within a video camera) and a vision processor 10. These two components are connected in a closed-loop, client-server relationship. A server represents an object that is waiting to be contacted by a client object so that the server can do something for the client. In DRV system 8, the server 11 is the reconfigurable photodetector array 23 in the video camera 29 and the client is the vision processor 10. The client vision processor in the computer 19 is programmed to generate commands, known as window request commands, that specify the spatial and temporal requirements (characteristics or configuration) of the video to be sensed on the reconfigurable photodetector array 23 in the video server 11. These window request commands are transmitted to the reconfigurable photodetector array via a digital command data link 12. Once the reconfigurable photodetector array receives a window request command, it reconfigures its resources to satisfy the demands of the window request command. After reconfiguration, the reconfigurable photodetector array acquires the video and transmits it back to the vision processor 10 via the digital video data link 13.

To begin a client-server cycle, the client vision processor 10 in the computer 19 identifies a need for one or more video windows, each of a certain field-of-view, spatial resolution, frame rate, and spectral content. It creates a window request command and passes that to the reconfigurable photodetector 23 in the video server 11. The array, which contains on-chip circuitry to enable spatial and temporal data reduction via overlapping windows, then reconfigures itself according to the demands of the window request command. New video frames are sensed according to the current photodetector array configuration and transmitted back to the vision processor client 10. The reconfigurable photodetector array 23 may simultaneously transmit multiple windows, such as a background window and overlapping target windows, over multiple on-chip serial ports. The client-server loop can occur on a frame-by-frame basis, if necessary. If one or more video windows do not need to be altered in a given frame, then the DRV system 8 and reconfigurable photodetector array 23 will remember the window configuration and contents and continue to acquire and transmit those windows.

DRV system 8 is useful for applications and platforms requiring single or multiple target detection, tracking, cueing, and identification, especially when such applications are constrained by requirements for limited bandwidth, processing, space, weight, and power. Enabled by a reconfigurable photodetector array, DRV system 8 allows simultaneous acquisition and tracking of multiple targets widely separated in the field of view, without the need for smooth-pursuit mechanical tracking. Depending on the number of targets of interest, the system forms one or more high-resolution windows overlapping a low-resolution field-of-view, each high-resolution window containing a target of interest. While targets are being tracked at high resolution, the low-resolution background window remains active and continues to search for new targets over a wide field-of-view. Templates for identifying targets of consequence can be input into the system and stored to be used for automatic selection of such targets for review and tracking at high resolution. In addition, targets can be initially detected based on their movement, contrast, shape, and, with appropriate video photodetector arrays, heat emission or color. DRV system 8 is described below in more detail in FIGS. 2–6.

Figure 2:
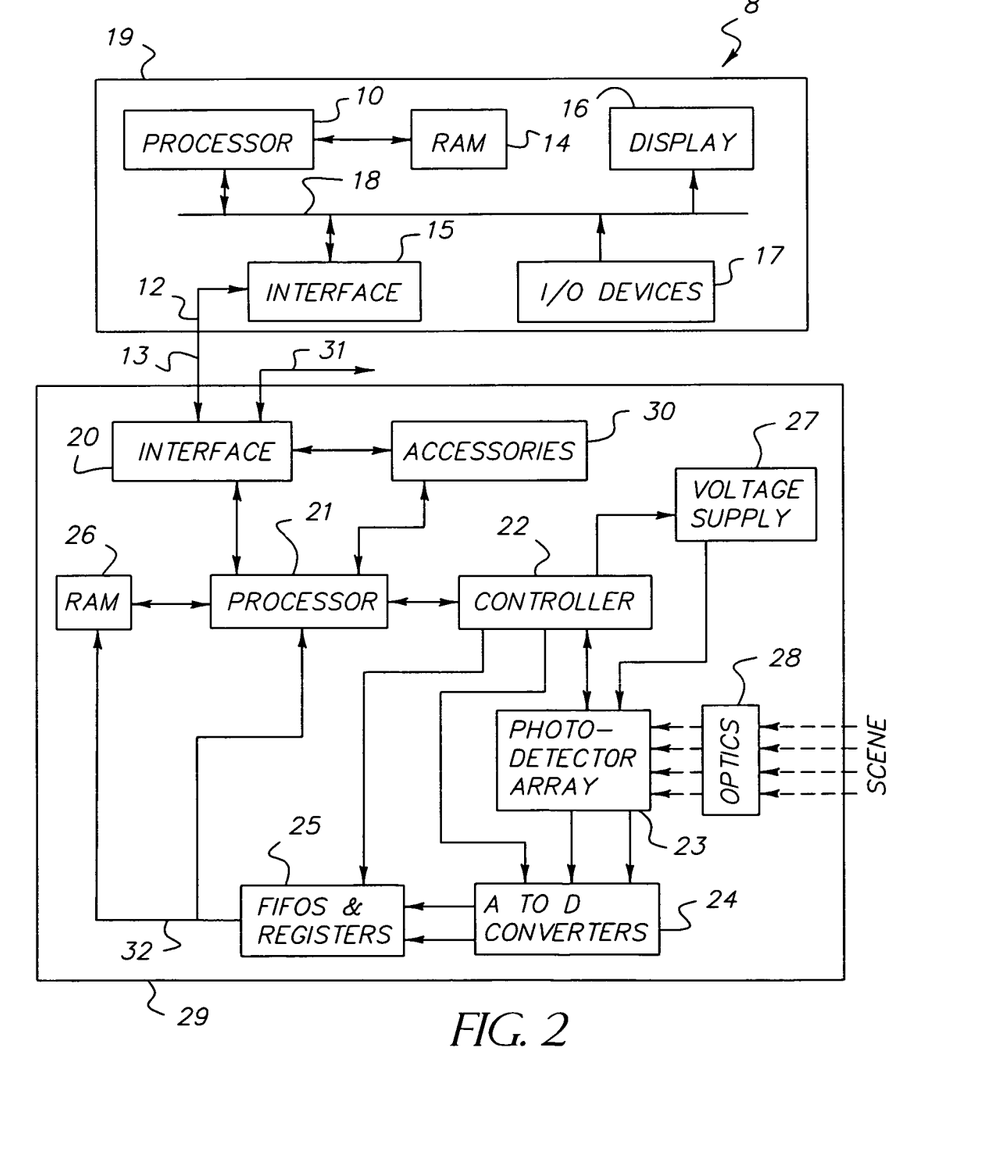
FIG. 2 is a more detailed block diagram of the system of FIG. 1 showing a host computer, video camera, one photodetector, and an embedded controller external to the photodetector.

Referring to FIG. 2, one embodiment of system 8 is shown having a host computer 19 and a digital video camera 29. The host computer 19 includes the vision processor 10 that acts as a client and generates the window request command and processes received digital video. Vision processor 10 may be either a single processor or a multi-processor network that is connected to an arbitrary computer peripheral bus 18 and the random access memory (RAM) 14. Also communicating with the peripheral bus 18 is a video display 16 and one or more input/output devices 17 that may include, but are not limited to, a mouse, joystick, keyboard, track ball, keypad, and custom user console. A bi-directional digital interface 15 is responsible for transmitting window request commands from the vision processor 10 to the video camera 29 via the digital command data link 12. The digital interface 15 may be any wirebound or wireless interface capable of transmitting the window request commands and receiving digital video.

The digital video camera 29 contains a bi-directional digital interface 20 that is compatible with the host computer interface 15. The video camera interface 20 may also have multiple ports for networking multiple video cameras 29 over additional wirebound or wireless digital channels 31. The digital interface 20 connects directly to an embedded processor 21. This processor is responsible for handling the digital communication protocol among the host computer, video camera, and any additional networked video cameras. The processor 21 shares a bi-directional data link with one or more programmable logic devices 22 that act as a controller for the reconfigurable CMOS photodetector array 23. The controller 22 also interfaces to programmable voltage supplies 27, analog-to-digital converters 24, as well as FIFOs and registers 25 that pipeline multiple video channels into one digital video data bus 32. The video bus 32 delivers digital video to either the processor 21 or to a bank of random access memories 26. Optics 28 are necessary to focus light onto the reconfigurable array 23. Additional accessories 30 may be embedded in the camera without detracting from the spirit of this invention. These may include, but are not limited to, an embedded web server, microphones, serial ports, or a global positioning system receiver. The accessories 30 may share a link with the camera digital interface 20 or the embedded processor 21.

The closed-loop operation and data flow of the preferred embodiment in FIG. 2 are described in the following. First, the vision processor 10 creates an initial window request command to start the video acquisition process. A likely initial command would be for a wide field-of-view, low-resolution window that occupies the entire reconfigurable photodetector array 23. The vision processor may use this initial window for detecting target motion or target contrast against a background. The vision processor 10 then dispatches the window request via the host computer peripheral bus 18 to the host digital interface 15. Here the window request is repackaged according to the communication protocol being employed and transmitted via the digital command data link 12. Next, the window request command is received by the video camera digital interface 20 and conveyed to the embedded processor 21. Here, the window request command is extracted from its digital transmission protocol and transmitted to the embedded system controller 22 via a simple serial data link. Within the controller 22, the window request command is slated into a series of digital vectors for controlling the multiple, programmable windows on the reconfigurable photodetector array 23, the photodetector array bias voltages 27, multi-channel video digitization 24, and video multiplexing 25. The photodetector array 23 views a scene through optics 28. The controller 22 sends spatial vectors to the photodetector array directing the photodetector array 23 to output a two-dimensional array of pixels (or pixel signals) imaging the scene in a frame combining the pixels into one or more windows which may be overlapping. The photodetector array 23 may as described in earlier cited, JPL New Technology Report NPO-20534 and U.S. Pat. No. 5,949,483, and in the NASA Technology Brief from JPL New Technology Report NPO-20555, also JPL New Technology Report NPO 20866 (Real-time Reconfigurable CMOS Imager with Variable High-Fidelity Spatial Sampling with Multiple Windows) A High Speed CMOS Imager with Motion Artifact Suppression and Anti-Blooming, which are herein incorporated by reference.

The reconfigurable photodetector array 23 is capable of changing the resolution of the array by automatically varying the number of individual pixels that constitute a single image resolving element, called a superpixel, having any number of individual pixels from a single pixel to all the pixels in the photodetector array. Said windows are areas of any size, shape, and frame rate within the boundaries of the photodetector array that contain a plurality of said superpixels all having the same resolution. The resolution of the image in each window is controlled by pixel averaging, or other pixel reduction techniques, to achieve the desired low to high resolution. Reconfiguration of imaging characteristics, such as integration time and frame rate, and the size, resolution, location, and overlap of windows in a frame, are controlled in accordance with each window request command. The host computer can direct the resolution of one or more photodetector array windows to be increased or decreased in multiple steps, and each window maintains a consistent resolution regardless of the resolution of overlapping foreground or background windows.

Furthermore, the photodetector array includes electronic circuitry simulating the function of an optical shutter such that when open the electronic shutter allows all the pixels to respond to the light entering the video camera and when closed not to respond to the light from the scene.

In response to signals from the controller 22, the reconfigurable photodetector array 23 outputs one or more channels of analog video to a multi-channel analog-to-digital converter 24. Multiple channels of digitized video are then transferred to a FIFO and registers 25 where additional control bits are added by the controller 22 and the digital video is multiplexed onto a single data bus 32. From the data bus 32 the video can go to a memory bank 26 where the video pixels will be stored as a contiguous block and can be accessed as appropriate by the embedded processor 21. The digital video on the data bus 32 can also be delivered directly to the embedded processor 21 where it is packetized into a transmission protocol and delivered directly to the digital interface 20. From the interface 20 the digital video is transmitted outside the camera over a digital video data link 13 to the host computer interface 15, where the video is received and delivered to a memory bank 14. From memory 14, the vision processor 10 can access the stored digital video and process it. Processing may take the form of image enhancement; compression; target detection, tracking, cueing, and recognition; or other algorithms designed to complete a mission involving surveillance or multi-target detection and tracking. After processing on the vision processor 10, the processed video is transferred over the peripheral bus 18 to a video display 16 for graphical display and possible user interaction via one or more of various input/output devices 17. Finally, the vision processor 10 creates a new window request command as a result of video processing results and/or user interaction. Thus begins a new cycle of the closed-loop DRV system.

Figure 3:
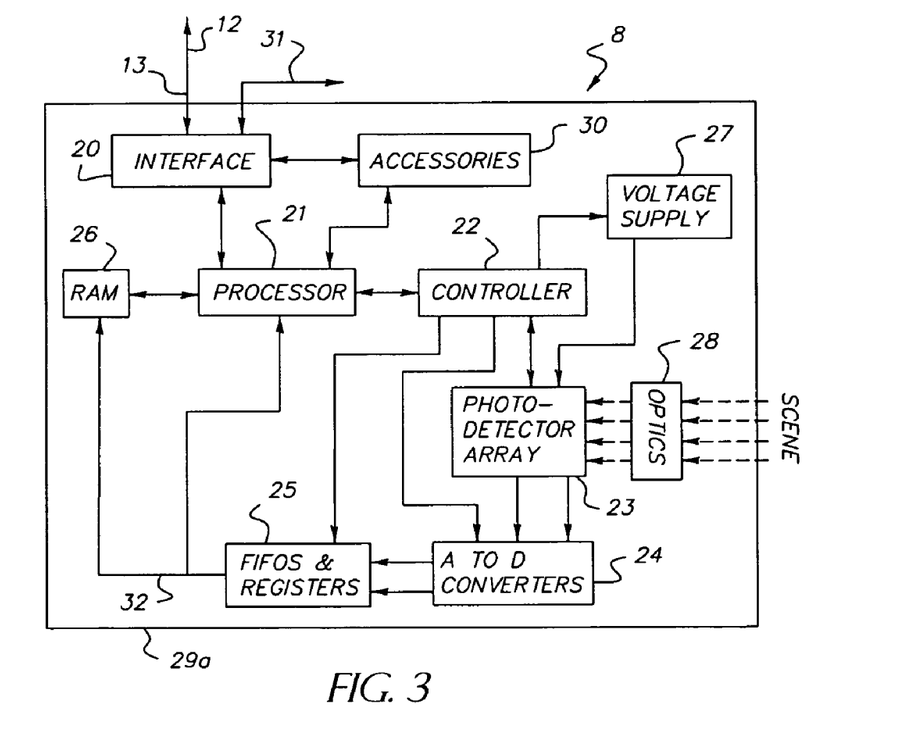
FIG. 3 is a block diagram similar to FIG. 2 of another embodiment of the present invention in which the host computer's capability is integrated into a processor within the video camera.

Referring to FIG. 3, another embodiment of a DRV system 8 is shown without a host computer in which a video camera 29*a* is provided having corresponding components to video camera 29 of FIG. 2, except for processor 21 and controller 22. This embodiment is suitable for embedded applications, such as remote autonomous surveillance and targeting. In such a system, the embedded processor 21 doubles as the client vision processor 10. The embedded controller 22, in combination with the reconfigurable photodetector array 23, acts as the video server. Thus, the basic client-server model of FIG. 1 is satisfied. The memory bank 26 can be increased in size in this embodiment to hold sequences of video images, intermediate target detection, tracking algorithm data, and executable code. The data links 12, 13, and 31 are used to transmit very low bandwidth control, status, and target information to and from a base station, the reconfigurable video camera 29*a*, and other similar video cameras 29*a*. For example, the base station may be a remote computer system.

Figure 4:
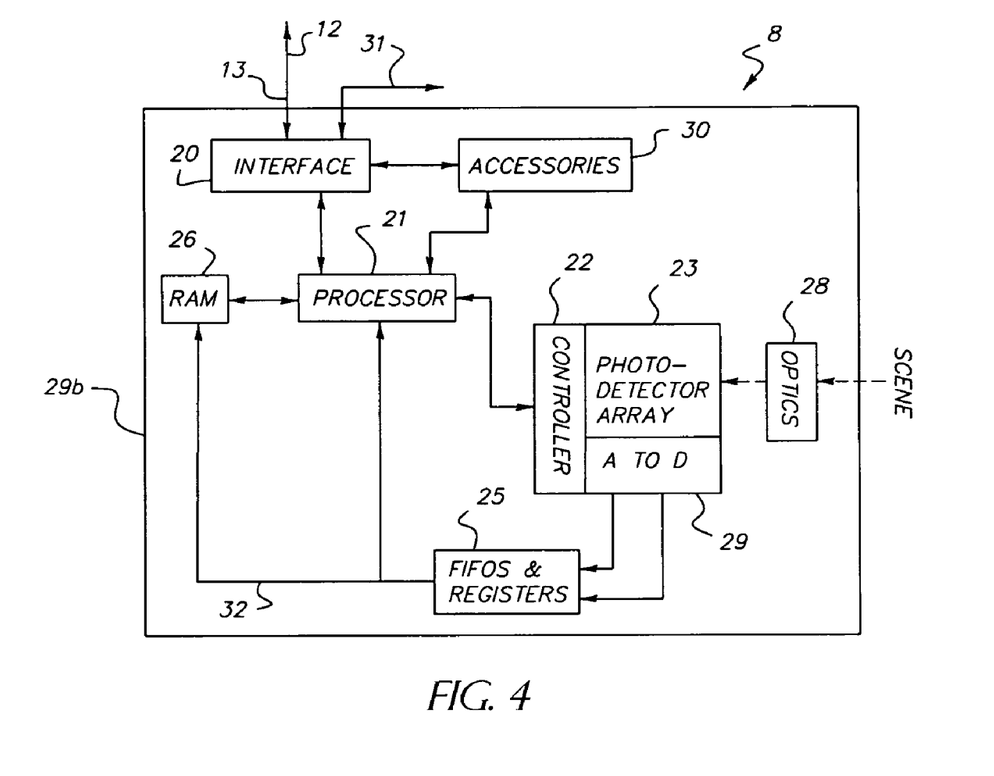
FIG. 4 is a block diagram similar to FIG. 2 of a further embodiment of the present invention in which the controller in the camera and the analog-to-digital converters are located on the same silicon substrate, i.e., chip, as the reconfigurable photodetector array.

Another embodiment of system 8 is shown in FIG. 4 in which a video camera 29*b* is provided having corresponding components to video camera 29 or 29*a* of FIGS. 2 and 3, respectively, except for the embedded controller 22 and the analog-to-digital converter 24 which have been integrated onto the reconfigurable photodetector array 23. This embodiment forms an application-specific DRV system for platforms that are highly constrained according to size, weight, and/or power.

Figure 5:
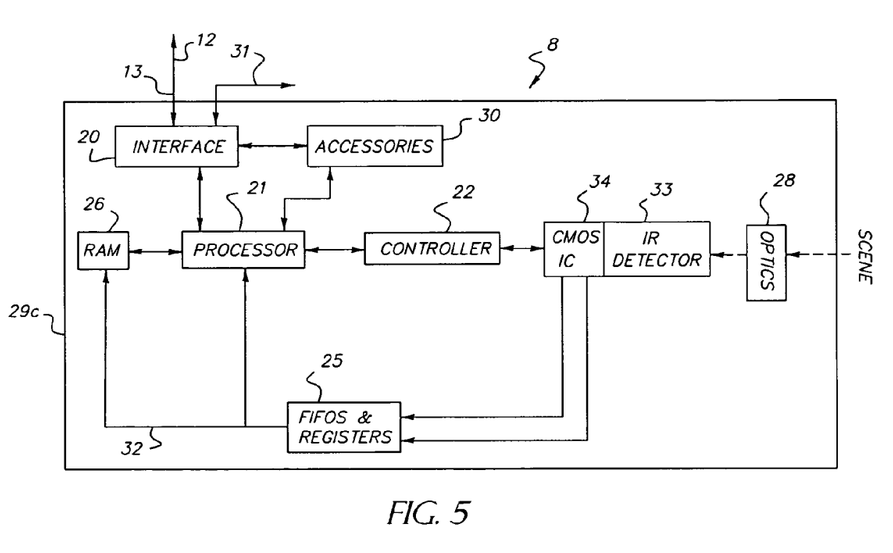
FIG. 5 is a block diagram similar to FIG. 2 of still another embodiment of the present invention in which the reconfigurable photodetector of the previous embodiments is replaced with an infrared detector bump-bonded to a read-out integrated circuit.

FIG. 5 shows still another embodiment of system 8 having an video camera 29*c* having corresponding components to video camera 29 or 29*a* of FIGS. 2 and 3, respectively, except for reconfigurable photodetector array 23 being replaced by an infrared detector 33 bump-bonded to a CMOS read-out integrated circuit 34 that implements and enables the present invention. The read-out integrated circuit also contains on-chip analog-to-digital converters for digitizing multiple video streams from the detector 33. Although this embodiment depicts an embedded controller 22, this controller 22 can be integrated onto the read-out integrated circuit (ROIC) 34 in the same manner as the embodiment described in FIG. 4.

Figure 6:
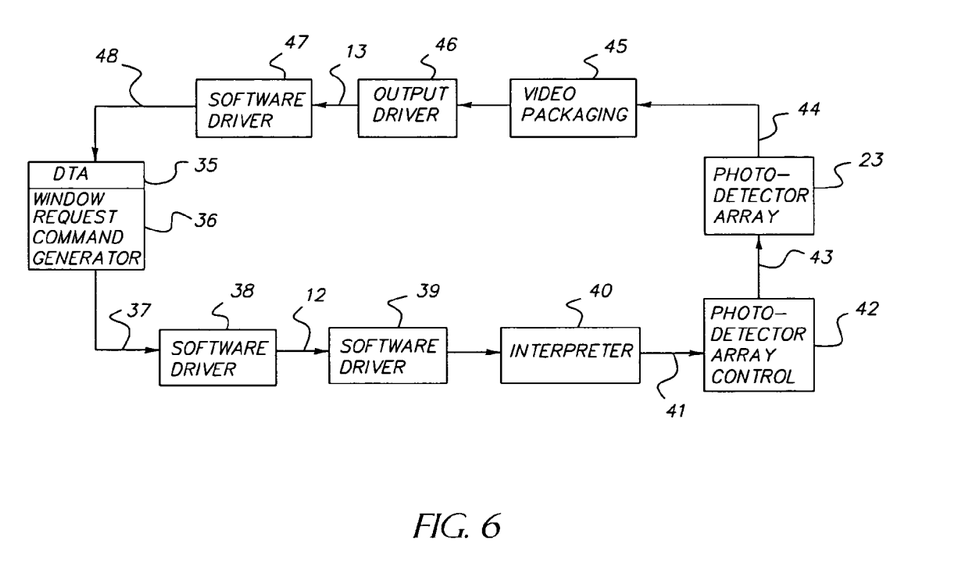
FIG. 6 illustrates the software architecture of the system in accordance with the present invention.

The software architecture of system 8 for providing dynamically reconfigurable vision is shown in FIG. 6. First, a Detection and Tracking Application (DTA) 35 generates a request for an initial video surveillance window that covers the entire photodetector field-of-view but possesses a low resolution. The DTA 35 passes this request to the window request command generator 36. Here, the request is packaged into a window request command 37 and sent to the video server 11. First, the window request command must pass through a software driver 38, which controls digital message transmission via the digital command data link 12. At the other end of the data link, another software driver 39 receives the transmitted window request command and passes it onto a window request command interpreter 40. This software module 40 takes apart the window request command message and handles communication via a serial command interface 41 with reconfigurable photodetector array's control firmware 42. Within the firmware control module 42, the window request command is translated into a sequence of digital control vectors and signals 43 that are used to manage the circuitry on the reconfigurable photodetector 23, the video digitization process, and the movement of digital video 44 through the video camera 29. The digital video 44 is next transferred to a video packaging node 45 where it is bundled into a software data structure and transferred to an output driver 46 that handles transmission via the video data link 13. At the opposite end of this data link, another software driver 47 receives the digital video and passes it across a bus 48 to the DTA 35. In the DTA video processing algorithms perform all or some of target detection, tracking, cueing, identification, recognition, and classification. Based upon the digital video content, the DTA 35 makes a determination as to what spatial, temporal, and spectral parameters the next video windows should possess. This information is then passed on to the window request command generator 36, and the cycle begins again. The DTA 35 may also possess the ability to display the digital video and create a graphical user interface for interaction with a human operator.

Figure 7A:
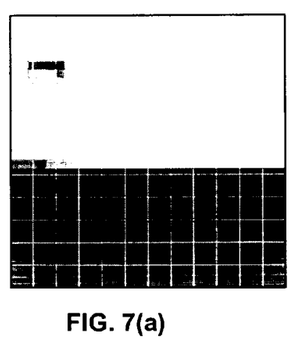
FIGS. 7a–c illustrate the progress of target detection and tracking by forming a wide field-of-view, low-resolution background window and higher resolution windows around the instantaneous locations of the target.
Figure 7B:
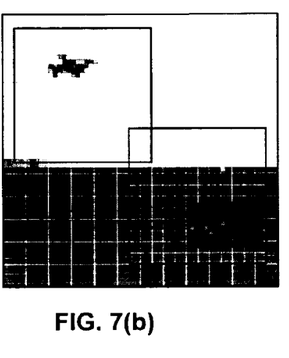
Figure 7C:
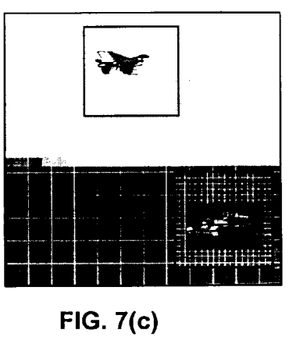

FIGS. 7a–7c illustrates schematically the process of target detection, tracking, and identification using first a low resolution window that occupies the entire frame (FIG. 7a), followed by the formation of multiple higher resolution windows around each target (FIG. 7b), and, finally, by multiple small, very high resolution windows each containing a target (FIG. 7c). At this point, the targets can be automatically identified by a human operator or by automatically comparing them to stored templates. This sequence also illustrates the overlapping nature of the multi-resolution windows of the present invention; FIGS. 7b and 7c depicts the higher resolution target interrogation windows being formed that non-destructively overlap the lower-resolution background surveillance window. Thus, the resolution in windows are gradually increased as the size of windows is decreased to facilitate the resolution of detail in target or target(s) and the accuracy of tracking of the target(s). All of the windows are time-correlated on the reconfigurable photodetector array 23 and can be read from it simultaneously through multiple output ports.

System 8 enables Dynamically Reconfigurable Vision (DRV) to provide adaptive image sensing driven by a computer or human operator's response to changing scenery, such that the amount of irrelevant video information sensed is reduced. Thus, system 8 has more effective bandwidth and computational resource utilization than traditional vision systems, whereby a scene may be imaged in time-correlated, overlapping windows, with frame-by-frame local (window) resolution selection. In real time, the system adaptively adjusts to changing scene dynamics, thus reducing the amount of irrelevant data read off the reconfigurable photodetector array and making better use of the available communication and data processing resources. Furthermore, the reconfigurable photodetector array can enable multiple windows of varying resolution that can overlap in a non-destructive fashion and can be retrieved from the reconfigurable photodetector array simultaneously. Several technologies make this possible, including the use of one or more reconfigurable photodetector arrays that detect visible, infrared, or ultraviolet radiation. In the case of visible radiation, the reconfigurable photodetector array can use a complementary metal-oxide semiconductor (CMOS) photodetector array and on-chip (monolithic) spatial and temporal data reduction circuitry. For infrared detection, the array may be an infrared photodetector array, where a CMOS readout integrated circuit (ROIC) is bonded to each photodetector array, and there is circuitry on the ROIC that implements spatial and temporal data reduction. The host computer 19 in the embodiment of FIG. 2 and the processor 21 in the embodiments of FIGS. 3, 4, and 5, control photodetector array 23 or ROIC 34 via controller 22 to provide multiple independently controllable, time-correlated, frequently overlapping windows for a frame of an image on the photodetector array 23 or ROIC 34 that can be reconfigured according to size, location, resolution, integration time, and frame rate. The multiple photodetector array windows can be dynamically reconfigurable in real time on a frame-by-frame basis, on the order of microseconds per reconfiguration. The client-server software architecture of system 8 enables the vision processor client to pass window request command messages to the reconfigurable photodetector array server, which in turn delivers the requested video windows back to the client processor. The system 8 is capable of simultaneous reconfiguration, integration, processing, and readout of multiple video windows.

One feature of system 8 is that the host computer 19 (or processor 21) issues only one brief high-level configuration command per frame to the photodetector array, as opposed to prior art systems which require a host computer to send multiple control signals to the reconfigurable photodetector array for the extraction of the signal from each superpixel, i.e., averaged pixel set, imaged. Further, by using an electronic shutter on the pixel array, all pixels are exposed simultaneously irrespective of their position, size, and illumination history. The pixel averaging technique in the reconfigurable photodetector array does not require pixel value normalization by the computer, reducing processing and communication requirements to the host computer.

Another feature is that the video server 11 allows frame-by-frame software control of on-chip photodetector array windowing, pixel resolution, and pixel averaging functions. Low-bandwidth video transmission is provided to the host computer by the reconfigurable photodetector array in the camera having spatial and temporal data reduction means, under control by the host, to reduce the amount of image data communicated to the host in comparison with prior art vision system. Thus, based upon the scene content, a processor or human operator can issue window request commands on a per-frame basis to control the spatial, temporal, and spectral characteristics of windows in a frame. The topology of the windows of the reconfigurable photodetector array can be modified frame-by-frame in an appropriate response to the instantaneous conditions in the scene being imaged, thereby enabling multiple targets in a scene to be extracted such as for tracking, in which the host computer can determine signatures of target objects. This is facilitated by the ability of the system to control the resolution of the photodetector array windows automatically in selected windowed locations of the frame corresponding to the instantaneous location of the image of a target or other targets without changing the resolution of the remainder parts, i.e., windows, of the frame.

It is to be understood that the preceding descriptions are illustrative only and that changes may be made in the dynamically reconfigurable vision system, subject of this invention, in its components, materials and elements, as well as in all other aspects of this invention discussed herein without departing from the scope of the invention as defined in the claims.

The invention claimed is:

1. A vision system for imaging a scene using a dynamically reconfigurable photodetector array comprising:
   a video camera having at least one reconfigurable photodetector array capable of imaging a scene;
   means for controlling characteristics of imaging by said photodetector array; and a computer system for receiving signals from said photodetector array representing the scene imaged by said photodetector array and sending signals to said controlling means to configure the characteristics of imaging by said photodetector, wherein said photodetector array simultaneously provides signals representing a frame with one or more windows having pixels in which said signals are simultaneously readout from the photodetector array, and two or more of said windows are capable of overlapping in said frame.

2. The system according to claim 1 wherein said photodetector array further comprises means for controlling the resolution of the pixels in each of said windows.

3. The system according to claim 1 further comprising a client-server interface between said computer system and said controlling means.

4. The system according to claim 1 wherein said controlling means represents a controller located on said photodetector array.

5. The system according to claim 1 in which said controlling means represents a logic device separate from said photodetector array.

6. The system according to claim 1 wherein said computer system is integrated into said video camera.

7. The system according to claim 1 wherein said computer system is separate from said video camera.

8. The system according to claim 1 wherein said computer system sends signals to said controlling means representing window request commands that contain information used to dynamically reconfigure one or more of said photodetector array's imaging characteristics.

9. The system according to claim 1 wherein said characteristics represent spatial and temporal parameters.

10. The system according to claim 1 wherein said photodetector array contains a plurality of individual pixels that have fixed dimensions.

11. The system according to claim 1 wherein said photodetector array represents a complementary metal oxide semiconductor photodetector array responsive to radiation in the visible spectral range.

12. The system according to claim 1 wherein said photodetector array represents a device responsive to infrared wavelengths.

13. The system according to claim 1 wherein said photodetector array is bonded to a complementary metal oxide semiconductor read-out integrated circuit.

14. The system according to claim 1 wherein said computer system and said video camera are part of a closed-loop interactive system.

15. The system according to claim 1 wherein said computer system is capable of analyzing video imagery for target objects and determining the necessary position, size, shape, resolution, and frame rate of multiple, overlapping windows within said vision system's field of view.

16. The system according to claim 1 wherein said computer system is capable of determining the spectral signatures of said target objects.

17. The system according to claim 1 wherein said computer system further comprises a user interface enabling a human operator to analyze video imagery for target objects and determine the necessary position, size, shape, resolution, frame rate, and spectral content of multiple windows within said vision system's field of view.

18. The system according to claim 1 wherein said computer system further comprises means for generating a window request command to said video camera identifying said characteristics.

19. The system according to claim 1 wherein said computer system further comprises means for generating a window request command to said video camera identifying said characteristics, in which said characteristics represents any of position, size, shape, resolution, frame rate, and spectral content of multiple windows.

20. The system according to claim 1 wherein when said windows overlap said windows overlap non-destructively in said frame.

21. The system according to claim 1 wherein said windows which overlap in said frame are of same or different resolutions.

22. The system according to claim 1 wherein said controlling means controls resolution of each of said windows by averaging pixels.

23. A method of tracking objects in a scene comprising a frame of windows comprising the steps of:
locating at least one object to be tracked in one of said windows in a low resolution;
forming one or more windows having said object in a high resolution which are capable of overlapping each other and overlapping said one or more of said windows at said low resolution in the frame in which said overlapping windows are simultaneously provided in the frame from signals simultaneously outputted from a photodetector array; and
identifying said object in said windows of said high resolution.

24. The method according to claim 23 wherein a plurality of said windows of high resolution are formed corresponding to the number of targets in said scene.

25. The method according to claim 23 further comprises the step of:
changing at least one window between different resolutions by averaging pixels of the window.

26. A system for imaging comprising:
at least one photodetector array capable of imaging successive frames in which each frame has windows of pixels at a low resolution; and
means for controlling the resolution of one or more windows of the frames to enable tracking of one or more objects at higher resolution windows in successive ones of said frames in which said windows are dynamically reconfigurable in real time between successive frames to facilitate said tracking, and said windows at said higher resolution non-destructively overlap one or more of said lower-resolution windows in the frame which are in the local of said higher resolution windows and at least one of said higher resolution windows are imaged simultaneously with at least one of said lower resolution windows being overlapped, and the pixels of the overlapping windows that are simultaneously imaged in the frame are simultaneously readout from the photodetector array.

27. The system according to claim 26 wherein said means is capable of controlling the resolution of windows by averaging pixels of said windows.

28. The system according to claim 26 wherein said overlapping windows are time-correlated frame-by-frame with location of said one or more objects in each successive frame.

29. The system according to claim 26 wherein said higher resolution windows are capable of overlapping each other.

30. A video imaging apparatus comprising:
at least one detector array for imaging a scene capable of simultaneous readout of multiple windows; and a controller for controlling characteristics of imaging by said detector array to simultaneously output one or more windows in which two or more of the windows when simultaneously readout by said detector array are capable of overlapping.

31. The video imaging apparatus according to claim 30 wherein said controller is operative in response to a host computer system.

32. The video imaging apparatus according to claim 30 wherein said windows simultaneously outputted are of the same or different resolution.

33. The video imaging apparatus according to claim 30 wherein said overlapping windows overlap non-destructively.

* * * * *